United States Patent
Leible et al.

(10) Patent No.: US 9,844,830 B2
(45) Date of Patent: Dec. 19, 2017

(54) METHOD FOR MANUFACTURING A POT-SHAPED PRESSURE VESSEL, AND SUCH A PRESSURE VESSEL

(75) Inventors: Hubert Leible, Durbach (DE); Max Dinkelbach, Buehl (DE); Dirk Stahlberger, Achern (DE); Horst Siefermann, Achern-Wagshurst (DE)

(73) Assignee: PROGRESS-WERK Oberkirch AG, Oberkirch (DE)

( * ) Notice: Subject to any disclaimer, the term of this patent is extended or adjusted under 35 U.S.C. 154(b) by 977 days.

(21) Appl. No.: 12/722,019

(22) Filed: Mar. 11, 2010

(65) Prior Publication Data

US 2010/0230421 A1   Sep. 16, 2010

(30) Foreign Application Priority Data

Mar. 12, 2009   (DE) .................. 10 2009 013 629

(51) Int. Cl.
| | |
|---|---|
| B23K 11/00 | (2006.01) |
| F16F 9/05 | (2006.01) |
| B23K 11/093 | (2006.01) |
| F16B 37/06 | (2006.01) |

(52) U.S. Cl.
CPC .......... B23K 11/004 (2013.01); B23K 11/093 (2013.01); F16F 9/057 (2013.01); F16B 37/061 (2013.01); Y10T 29/49611 (2015.01); Y10T 29/49826 (2015.01)

(58) Field of Classification Search
USPC ......... 267/64.11, 64.12, 64.13, 64.15, 64.16, 267/64.17, 64.18, 64.19, 64.21, 64.22, 267/64.23, 64.24, 64.25, 64.26, 64.27, 267/64.28
See application file for complete search history.

(56) References Cited

U.S. PATENT DOCUMENTS

| | | | | |
|---|---|---|---|---|
| 2,202,405 | A | * | 5/1940 | Smith ........................... 219/107 |
| 3,905,173 | A | * | 9/1975 | Gerken ......................... 403/242 |
| 4,114,670 | A | * | 9/1978 | Akashi et al. ................. 411/176 |

(Continued)

FOREIGN PATENT DOCUMENTS

| | | |
|---|---|---|
| CA | 2 287 668 A1 | 6/2000 |
| DE | 27 15 271 | 10/1977 |

(Continued)

*Primary Examiner* — Nicholas J Lane
(74) *Attorney, Agent, or Firm* — Harness, Dickey & Pierce, P.L.C.

(57) ABSTRACT

A method for manufacturing a pot-shaped pressure vessel, in particular an air spring pot for a vehicle, comprises the following steps: providing a pot, which comprises a bottom, which comprises at least one aperture, providing at least one screw, which comprises a head and a shank, inserting the shank of the at least one screw through the aperture from an inside of the pot, so that the shank of the screw protrudes from an outside of the bottom, and firmly joining the screw to the bottom of the pot. In the transitional area from the head to the shank at least one screw comprises a connecting section tapering from the head to the shank and extending all round the circumference. In inserting the shank through the aperture the connecting section is brought to bear against the edge of the aperture, and the connecting section is joined to the edge of the aperture along its bearing contact with the latter.

6 Claims, 3 Drawing Sheets

(56) References Cited

U.S. PATENT DOCUMENTS

| | | | |
|---|---|---|---|
| 4,844,428 A * | 7/1989 | Margolis et al. | 267/64.21 |
| 5,105,060 A * | 4/1992 | Tanaka et al. | 219/95 |
| 5,752,692 A * | 5/1998 | Crabtree et al. | 267/64.24 |
| 5,918,863 A * | 7/1999 | Crabtree et al. | 267/64.24 |
| 6,942,201 B2 * | 9/2005 | Leonard | 267/64.27 |
| 2006/0181145 A1 | 8/2006 | Stuani | |
| 2008/0101857 A1 * | 5/2008 | Christ | 403/272 |

FOREIGN PATENT DOCUMENTS

| | | |
|---|---|---|
| DE | 199 54 912 A1 | 7/2000 |
| JP | 8-174234 | 7/1996 |

\* cited by examiner

METHOD FOR MANUFACTURING A POT-SHAPED PRESSURE VESSEL, AND SUCH A PRESSURE VESSEL

CROSS REFERENCE TO FOREIGN APPLICATION

The present application claims priority of German patent application No. 10 2009 013 629.0 filed on Mar. 12, 2009.

BACKGROUND OF THE INVENTION

The invention generally relates to methods for manufacturing pot-shaped pressure vessels.

More specifically, the invention relates to a method for manufacturing a pot-shaped pressure vessel, in particular an air spring pot for a vehicle, comprising the following steps:

providing a pot, which comprises a bottom, which comprises at least one aperture, providing at least one screw, which comprises a head and a shank, inserting, the shank of the at least one screw through the aperture from an inside of the pot, so that the shank of the screw protrudes from an outside of the bottom and firmly joining the screw to the bottom of the pot.

The invention further generally relates to pot-shaped pressure vessels.

More specifically, the invention further relates to a pot-shaped pressure vessel, in particular an air spring pot for a vehicle, comprising a pot, which comprises a bottom, which comprises at least one aperture, and at least one screw, which comprises a head and a shank, the screw being inserted through the aperture from an inside of the pot, so that the shank of the screw protrudes from an outside of the bottom, and the screw being firmly joined to the bottom of the pot.

Without limiting the generality, the present invention will be described with reference to a pot-shaped pressure vessel, which is used as an air spring pot of an air spring for a vehicle.

Air springs are used in vehicle construction instead of or in addition to steel springs for the suspension of the vehicle body. Air springs are also used in vehicle construction for ride height adjustment of the body.

In the case of air springs the suspension is achieved by a volume of gas. The volume of gas is here situated in a pot-shaped pressure vessel, referred to as an air spring pot. At its upper end, as fitted in a vehicle, the air spring pot, which is usually made of sheet steel, comprises a bottom, from which a pot wall extends downwards approximately perpendicularly to the bottom. A bellows is usually affixed to the lower end of the pot wall, as fitted in a vehicle.

For fitting the air spring pot in a vehicle one or more screws are firmly joined to the bottom of the pot at the bottom of the pot. When the screws are fixed to the bottom of the pot, the respective shank of each screw protrudes approximately perpendicularly to the bottom from the outside thereof, that is to say upwards when the air spring pot is fitted in a vehicle. The screws serve to fix the air spring pot to the vehicle body, or more precisely to the spring dome. The screws fixed to the bottom of the air spring pot here have to fit into a predefined hole pattern in the spring dome and must therefore be correctly positioned and aligned according to the hole pattern.

In the prior art various methods are now known for joining the screws to the bottom of the air spring pot.

In a first known method of attaching the screws to the bottom of the air spring pot the heads of the screws are placed on the outside of the bottom and firmly joined to the bottom by friction welding. Since in friction welding the screws are moved relative to the bottom of the pot, in order for the resulting friction to bring about the welding fusion process, this approach has the disadvantage that the screws cannot be precisely positioned in the correct position relative to the hole pattern. Moreover if the bottom of the pot does not have the correct surface orientation owing to production tolerances at the points at which the screws are to be affixed, the shanks of the screws may furthermore also have an incorrect orientation relative to the hole pattern, that is to say an axial error. This known method of joining the screws to the bottom of the air spring pot is therefore subject to tolerances. A further disadvantage to attaching the screws onto the outside of the bottom is that the screw heads protrude from the outside of the bottom. In this method of affixing the screws to the bottom, therefore, depressions or troughs are provided in the bottom of the pot at the points where the screws are to be affixed, so that the screw heads do not protrude beyond the general level of the outside of the bottom. In this case, however, height tolerances of the screw heads may nevertheless be a factor, that is to say tolerances of the depressions in the bottom of the pot may mean that the screw heads still protrude beyond the general level of the outside of the bottom, thereby making it more difficult to fit the air spring pot in the correct position on the spring dome. The advantage of attaching the screws to the outside of the bottom of the air spring pot, however, is that the bottom of the pot as a whole constitutes a closed and therefore pressure-tight surface.

In another known method for joining the screws to the bottom of the air spring pot, from which the method referred to in the introductory portion and the pressure vessel referred to in the introductory portion depart, the pot is provided in such a way that that the bottom has an aperture for each screw. In this case the shank of each screw is inserted through the respective aperture from the inside of the pot, until the face of the screw head facing the shank bears against the inside of the bottom of the pot. The screw head is then firmly joined to the inside of the bottom of the pot by metal-active gas-shielded (MAG) welding. Even in this known method for firmly joining the screws to the bottom of the air spring pot there is still the disadvantage that, in the event of incorrect orientations of the bottom of the pot, the shanks of the screws will have an axial error. With this known method there is furthermore the disadvantage that for welding use is made of a welding filler metal, which in uncontrolled cooling can give rise to incorrect positioning of the screw shanks. In the event of incorrect orientations of the pot bottom, it is not possible with this known method to control the alignment of the shanks of the screws according to the hole pattern in order to compensate for incorrect positioning of the bottom, because as the welding filler metal cools the respective screw head is drawn uncontrollably against the bottom of the pot. In addition, in the deposit-welding process, porosity or air inclusions can form, which may lead to leaks in the area of the respective aperture in the bottom of the air spring pot, with the result that the pot is not pressure-tight and therefore not suitable as an air spring pot.

One approach, which represents a modification of the known method referred to above, is to likewise insert the screw shanks through the respective aperture in the bottom of the air spring pot from the inside and then to press the screws into the aperture together with an additional sealing element or sealant. Here too, however, there is still the disadvantage of insufficient allowance for tolerances, because it is not sufficiently possible to purposely align the shanks of the screws in the event of incorrect orientations of the bottom of the air spring pot.

SUMMARY OF THE INVENTION

The object of the invention, therefore, is to specify a method for manufacturing a pot-shaped pressure vessel, in particular an air spring pot for a vehicle, of the aforementioned type, which can be performed with greater production accuracy.

It is also the object of the invention to specify a pot-shaped pressure vessel of the aforementioned type, which can be manufactured with greater production accuracy.

According to a first aspect of the invention, a method for manufacturing a pot-shaped pressure vessel is provided, comprising the following steps: providing a pot having a bottom having at least one aperture, providing at least one screw having a head and a shank, the least one screw, in a transitional area from the head to the shank, having a connecting section tapering from the head to the shank and extending all round a circumference about a longitudinal axis of the screw, inserting the shank of the at least one screw through the aperture from an inside of the pot, so that the shank of the screw protrudes from an outside of the bottom, wherein the connecting section of the screw is brought to bear against an edge of the aperture, and firmly joining the screw to the bottom of the pot by joining the connecting section to the edge of the aperture.

According to another aspect of the invention, a pot-shaped pressure vessel is provided, comprising a pot having a bottom having at least one aperture, at least one screw having a head and a shank, the at least one screw having a connecting section tapering from the head to the shank and extending all round a circumference about a longitudinal axis of the screw, the screw being inserted through the aperture from an inside of the pot, so that the shank of the screw protrudes from an outside of the bottom, the connecting section being in bearing contact with the edge of the aperture, and the screw being firmly joined to the bottom of the pot, wherein the connecting section is joined with the edge of the aperture.

The method according to the invention and the pressure vessel according to the invention rely firstly on the concept, described above, that the pot comprises a bottom, which comprises at least one aperture, the shank of the at least one screw being inserted through the aperture from the inside of the pot. In contrast to the prior art, however, the screw comprises a connecting section tapering from the head to the shank and extending all round the circumference, which in inserting the shank through the aperture of the connecting section comes to bear against the edge of the aperture. Owing to the design of the connecting section, tapering in a longitudinal direction and extending all round the circumference, this is in substantially linear contact with the edge of the aperture when the shank is inserted through the aperture. As a result the shank can be oriented by tilting in order to compensate for tolerances, without sacrificing the linear, fully circumferential bearing contact of the connecting section against the edge of the aperture. This in turn makes it possible, without any additional measures for sealing the aperture, to fix the screw to the bottom of the pot by joining the connecting section to the edge of the aperture along its bearing contact with the latter.

Since in the case of the method according to the invention and the pot-shaped pressure vessel according to the invention the head of the screw does not come into planar contact with the inside of the bottom, as in the known methods and pressure vessels, the connecting section instead bearing substantially linearly against the edge of the aperture, the at least one screw can be precisely oriented in order to compensate for incorrect orientations of the bottom relative thereto. The substantially linear bearing contact of the connecting section against the edge of the aperture also makes the method according to the invention suited to welding without welding filler metal, so that in contrast to the known method the set orientation of the shank of the screw is maintained.

The method according to the invention and the pressure vessel according to the invention therefore reduce the reject rate in series production.

In a preferred refinement the connecting section is joined to the edge of the aperture by resistance welding.

No welding filler metal is needed in the resistance welding. The use of resistance welding therefore has the advantage that no distortion occurs as the weld cools and also that no porosity or air inclusions occur, which might lead to leakages from the pressure vessel. The use of resistance welding is permitted, in particular, due to the invention of the at least one screw having a tapering connecting section extending all round the circumference, since the bearing contact of the connecting section against the edge of the aperture is substantially linear, so that in the resistance welding the greatest resistance and hence the greatest heating is concentrated on this linear bearing contact. Were resistance welding to be used in the conventional methods, in which screws having a screw head with a right-angled transition to the screw head are used, welding projections would have to be provided on the side of the screw head facing the shank, in order to permit directed resistance welding. However, these welding projections would not allow pressure-tight closure of the aperture by means of the screw without additional measures. As an alternative to the welding projections, an annular weld collar could also be provided on the screw head, which although it would afford pressure-tight closure of the aperture by means of the screw, again does not permit free orientation of the axis of the screw in relation to the bottom of the pot.

A further particular advantage of this measure is that compared to the known methods and known pressure vessels the head of the screw can be of particularly compact design in a transverse direction to the axis of the screw. Both in the known methods in which the screw heads are attached and friction welded on to the outside of the screw, or in the known methods in which, although the screws are inserted through the bottom from inside, the screw head is welded to the inside of the bottom by metal-active gas-shielded (MAG) welding, the screw heads must be of sufficient size. These known methods are thereby not suited to the attachment of screws at poorly accessible points on the inside of the pot, or at points at which there is insufficient bearing surface available for the screw heads. The resistance welding in conjunction with the tapering connecting section of the screw allows the screw head to be selected so small, however, that the screw can be affixed even at points on the bottom at which space is restricted, for example where the inside of the bottom is laterally confined by closely adjacent vessel walls.

In a further preferred refinement of the method and the pressure vessel the connecting section is of conical design shape.

This affords the advantage that it allows the screws to be inexpensively manufactured as simple turned parts or parts produced by cold extrusion.

As already indicated above, it is preferred, in the case of the pressure vessel according to the invention, if the connecting section seals off the opening.

This affords the advantage that no further sealing elements or sealants have to be provided, so that manufacture of the pressure vessel according to the invention is particularly easy and cost-effective.

In a further preferred refinement of the method the shank of the screw is oriented into a predefined position before firmly joining the screw to the bottom.

This measure has the advantage that incorrect positions of the bottom of the pot in the area of the aperture can be compensated for and the shank is therefore always correctly oriented, something that is especially ensured by the design of at least one screw with its connecting section tapering in a longitudinal direction and extending all round the circumference. In conjunction with the aforementioned resistance welding, the shank of the screw maintains the set orientation even after the resistance welding.

In a further preferred refinement of the method the bottom of the pot comprises multiple apertures, a screw, which in the transitional area from the head to the shank comprises a connecting section tapering from the head to the shank and extending all round the circumference, in each case being inserted through each aperture from an inside of the pot, the respective connecting section being brought into bearing contact with the edge of the respective aperture, and the shanks of the screws being oriented in a defined manner and each connecting section in the set orientation being firmly joined to the respective edge of the aperture.

In the pressure vessel according to the invention the bottom of the pot correspondingly comprises multiple apertures, a screw, which in the transitional area from the head to the shank comprises a connecting section tapering from the head to the shank and extending all round the circumference, in each case being inserted through each aperture from an inside of the pot, the respective connecting section being brought into bearing contact with the edge of the respective aperture, and the shanks of the screws being oriented in a defined manner.

In the method according to the invention it is therefore possible to manufacture pot-shaped pressure vessels, in particular air spring pots for vehicles, in which the multiple, usually three screws, are each individually oriented according to a predefined hole pattern in order to compensate for tolerances, all apertures in the bottom of the pot being closed pressure-tightly by the connecting sections after these have been firmly joined to the edge of the respective aperture.

In this way the pressure vessel according to the invention can be inexpensively manufactured with a low reject rate in series manufacture.

Further advantages and features are set forth in the following description and the drawing attached.

It goes without saying that the aforementioned features and features yet to be explained below can be used not only in the particular combination specified but also in other combinations or in isolation without departing from the scope of the present invention.

BRIEF DESCRIPTION OF THE DRAWINGS

An exemplary embodiment of the invention is represented in the drawing and will be described in more detail below with reference to said drawing, in which.

DETAILED DESCRIPTION OF A PREFERRED EXEMPLARY EMBODIMENT

Figure 1:
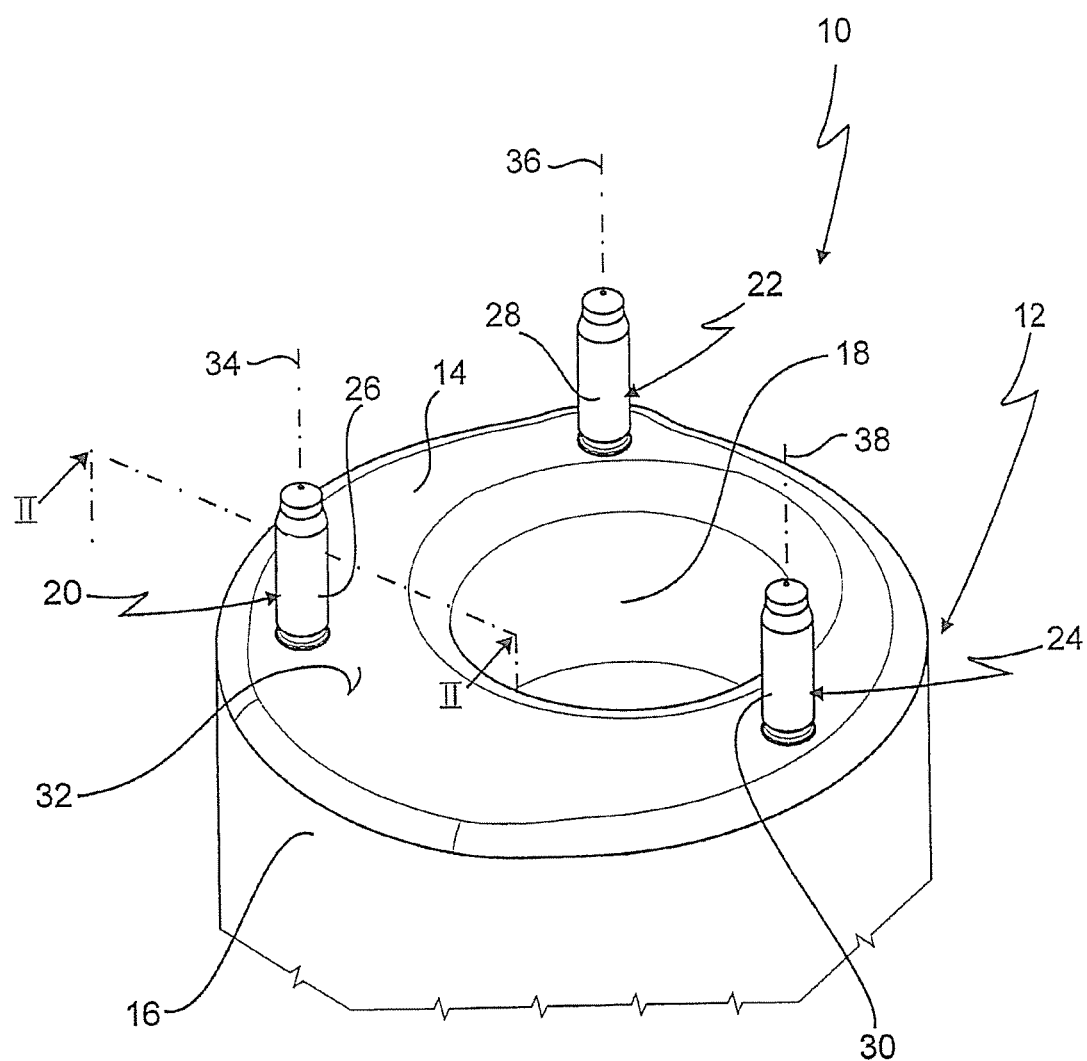
FIG. 1 shows a perspective representation of a detail of a pot-shaped pressure vessel, in particular an air spring pot.
Figure 2:
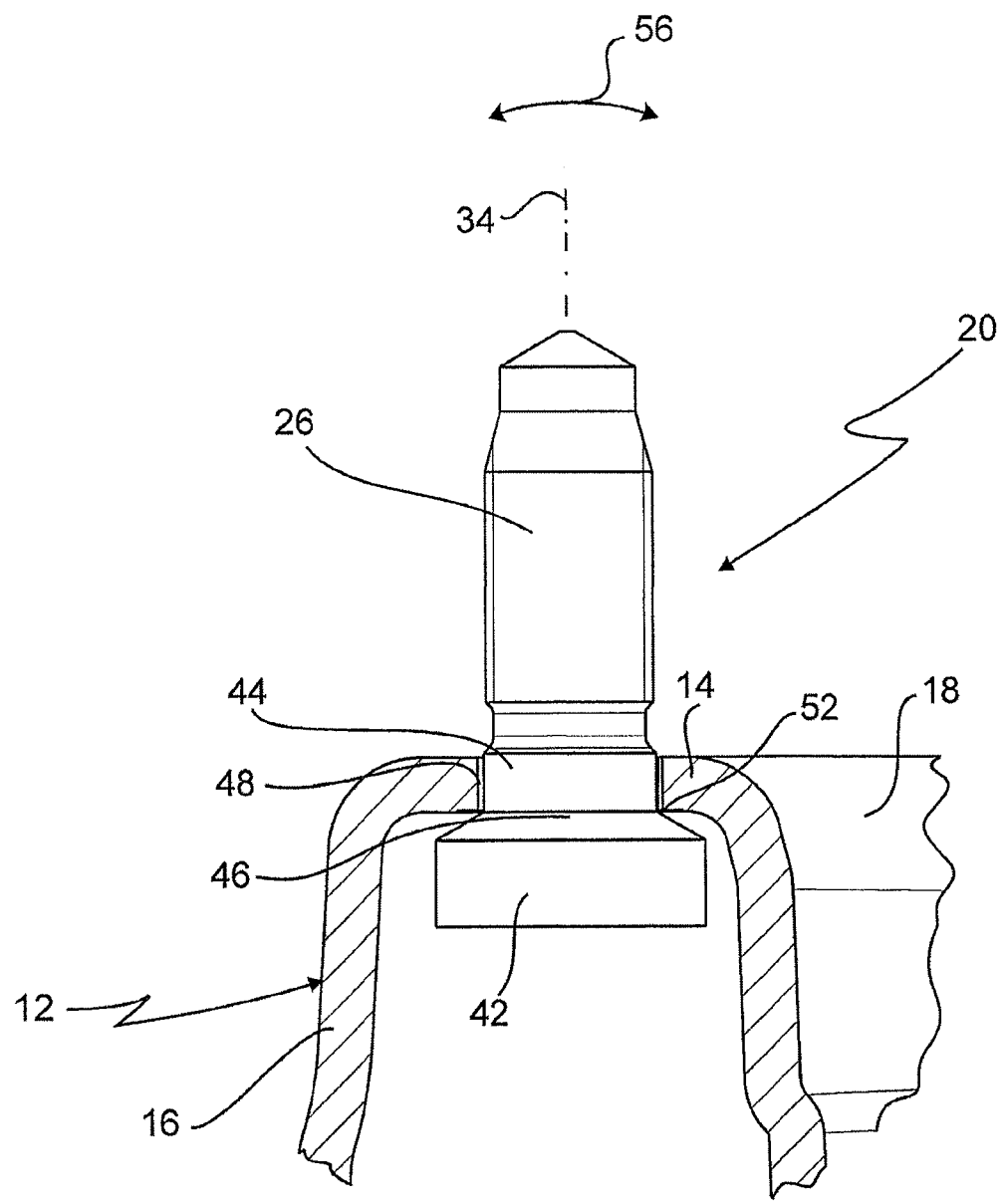
FIG. 2 shows a further enlarged representation of a detail of the pressure vessel in FIG. 1 in a partial section along the line II-II in FIG. 1, FIG. 2 showing an intermediate stage in the manufacture of the pressure vessel.
Figure 3:
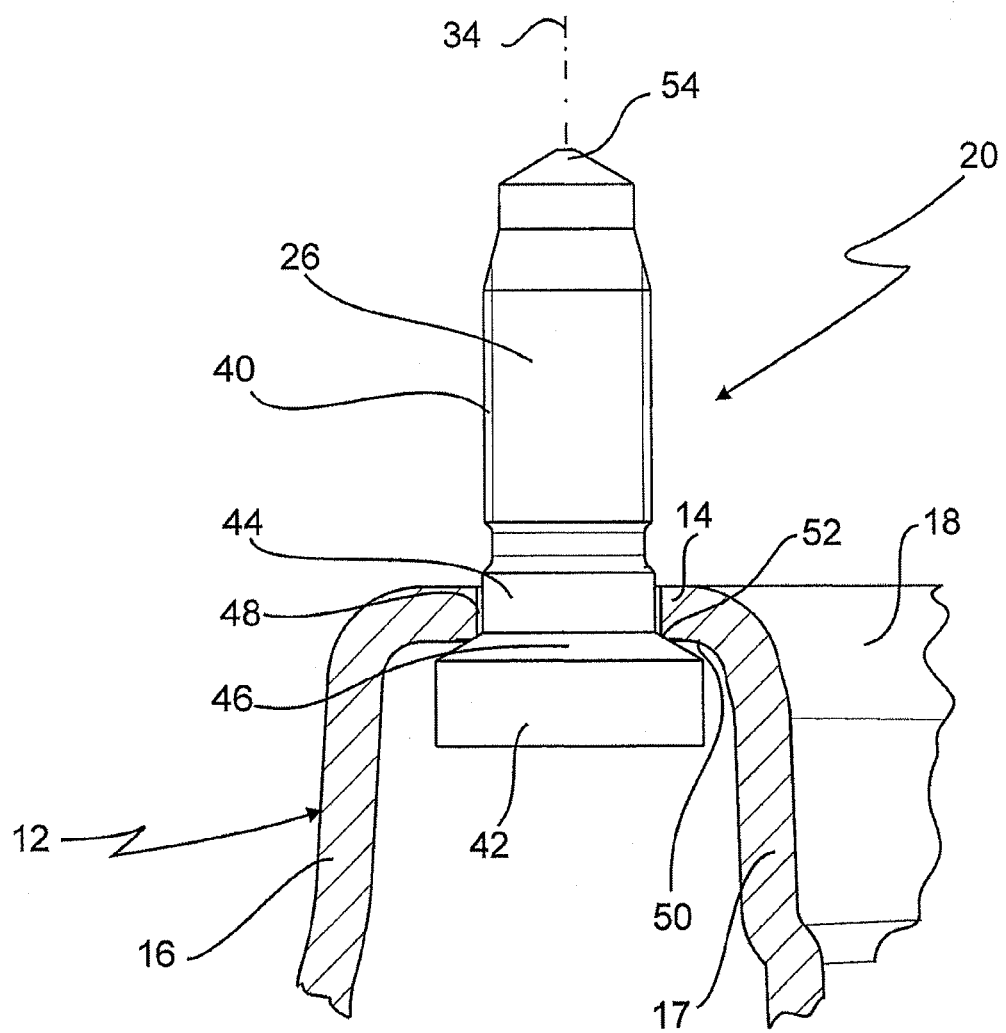
FIG. 3 shows the same detail as in FIG. 2 on completion of the manufacture of the pressure vessel.

FIG. 1 represents a detail of a pot-shaped pressure vessel provided with the general reference numeral 10. Further details of the pressure vessel 10 and its manufacture are represented in FIGS. 2 and 3.

The pressure vessel 10 is, in particular, an air spring pot, which is used as a component of an air spring for a vehicle.

The pressure vessel 10 comprises a pot 12, which is integrally formed in one piece from sheet steel, for example in a cold forming process.

The pot 12 comprises a bottom 14 together with a vessel wall 16 extending substantially perpendicularly away from the bottom 14. Approximately centrally in the bottom 14 the pot 12 in the exemplary embodiment shown comprises a trough 18, which serves as seating for the head bearing of a shock absorber (not shown).

In the fitted position of the pressure vessel 10 serving as an air spring pot, the pot 12, with the bottom 14 uppermost, as represented in FIG. 1, is affixed to the underside of a spring dome of the vehicle. In the exemplary embodiment shown three screws 20, 22, 24, as yet to be described below, are fixedly, that is to say permanently, joined to the bottom 14 of the pot 12, and are provided for affixing the pot 12 to the spring dome.

The screw 20 comprises a shank 26, the screw 22 comprises a shank 28 and the screw 24 comprises a shank 30, the shanks 26, 28 and 30 protruding from an outside 32 of the bottom 14 substantially perpendicularly to the outside 32. The shanks 26, 28 and 30 are provided with an external thread.

The positioning of the shanks 26, 28 and 30 in relation to the bottom 14 and also the orientation of the axes 34, 36 and 38 of the shanks 26, 28 and 30 is determined by the fitting position of the pressure vessel 10 in the vehicle and its attachment to the spring dome, the position of the shanks 26, 28 and 30 on the outside 32 of the bottom 14 and the orientation of the axes 34, 36 and 38 having to conform as precisely as possible to a corresponding hole pattern in the spring dome.

The method of attaching the screws 20, 22 and 24 to the bottom 14 of the pot 12 will be described below on the basis of the screw 20 with reference to FIGS. 2 and 3. The same applies to the other two screws 22 and 24 with regard to their design and their attachment to the bottom 14.

According to FIG. 2 the screw 20, in addition to the shank 26, which has an external thread 40, also comprises a head 42. The head 42 adjoins an end 44 of the shank 26, but not directly, the screw 20 between the head 42 and the end 44 of the shank 26 instead comprising a connecting section 46, which tapers in the longitudinal direction of the axis 34 from the head 42 to the end 44 of the shank 26 and extends around the axis 34 all around the circumference.

The connecting section 46 is, in particular, of conical design shape.

For manufacturing the pot-shaped pressure vessel 10 the pot 12 is first provided in accordance with FIG. 1, together with the screws 20, 22 and 24. The pot 12 is provided in such a way that at the positions of each of the screws 20, 22 and 24 it comprises an aperture, as is shown in FIG. 2 for an aperture 48 for the screw 20.

The shank 26 of the screw 20 is inserted through the aperture 48 from an inside 50 of the bottom 14, until the connecting section 46 of the screw 20 comes into bearing contact with an edge 52 of the aperture 48. The edge 52 is formed by the end of the aperture 48 facing the inside 50 of the bottom 14.

The connecting section 46 here bears with its full circumference against the edge 52 of the aperture 48, the point of contact between the connecting section 46 and the edge 52 being substantially linear owing to the tapering shape of the connecting section 46, because the connecting section 46 runs at an angle both to the inner bottom wall (inner side 50) and to the wall of the aperture 48. This linear bearing contact now makes it possible to orient the axis 34 of the shank 26 precisely. The axis 34 and thereby the shank 26 are oriented by a suitable device (not show), which acts on the shank 26, for example in the area of its tip 54, and orients the shank 26 in the required axial direction and fixes it in this orientation. The fully circumferential, substantially linear bearing contact of the connecting section 46 against the edge 52 of the aperture 48 is retained irrespective of whether the axis 34 needs to be tilted for exact orientation of the shank 26, for example owing to a tolerance in the orientation of the surface of the bottom 14 in the area of the aperture 48.

The orientation of the axis 34 is here possible in all angular directions, this being illustrated by a double arrow 56 for an orientation of the axis 34 in the drawing plane of FIG. 2.

The shank 26 of the screw 20 is oriented according to the predefined pattern of holes on the spring dome.

As soon as the shank 26 is oriented correctly in respect of the direction of its axis 34, the connecting section 46 is firmly joined to the edge 52 along its bearing contact against the edge 52 of the aperture 48, in order to fasten the screw 20 to the bottom 14 of the pot 12. For this purpose the connecting section 46 is joined by resistance welding along its bearing contact with the edge 52 of the aperture 48.

FIG. 3 shows the screw 20 after the resistance welding. The edge 52 of the aperture 48, which is substantially sharp-edged prior to the resistance welding, is slightly blunted after the resistance welding. At the same time the aperture 48 is sealed pressure-tightly by the resistance welding of the connecting section 46 to the edge 52 of the aperture 48. Since no welding filler metal is needed for the resistance welding, the position of the axis 34 of the shank 26 is also maintained in the previously oriented position after the welding, that is to say no distortion and hence no axial error of the shank 26 of the screw 20 occurs. Furthermore, porosity or air inclusions, which can occur in the area of the welding where welding filler metals are used, are avoided.

As can be seen from FIGS. 2 and 3, the bottom 14 in the area of the aperture 48 is only relatively small in extent perpendicular to the longitudinal direction (axis 34) of the screw 20. The vessel wall 16 and the inner vessel wall 17, which is formed by the trough 18, and which to both sides of the aperture 48 extend away approximately perpendicularly from the bottom 14, leave little room for the arrangement, manipulation and attachment of the screw 20 to the bottom 14, since the vessel walls 16, 17 are very closely adjacent. The method according to the invention, however, means that the head 42 of the screw 20 can be selected especially small, just small enough for the connecting section 46 to be in bearing contact with the edge 52 of the aperture 48. This allows the screw 20 to be affixed to the bottom 14, in particular very close to the vessel wall 16 or to the vessel wall 17, the latter being shown in FIGS. 2 and 3.

The other two screws 22 and 24 are similarly inserted through corresponding apertures in the bottom 14 of the pot 12 from the inside 50 thereof, and are attached to the bottom 14 of the pot 12 by resistance welding once the shanks 28 and 30 have been correctly oriented, as described above with regard to the shank 26.

What is claimed is:

1. A method for manufacturing a pot-shaped pressure vessel, comprising the following steps:

providing a pot having a bottom having at least one aperture defining a central axis and a circumferential edge, providing at least one screw having a head and a shank, said at least one screw, in a transitional area from said head to said shank, having a connecting section tapering from said head to said shank and extending all round a circumference about a longitudinal axis of said screw, inserting said shank of said at least one screw through said aperture from an inside of said pot, so that said shank of said screw protrudes from an outside of said bottom, wherein the full circumference of said connecting section of said screw creates a linear contact with said circumferential edge of said aperture, thereafter adjusting the angular position of the shank of said screw into a selected angular position with respect to said central axis by acting directly upon the shank of the screw, whereby the longitudinal axis of said screw is purposefully oriented at a non-zero angle relative to said central axis and the full circumferential linear contact between said connecting section of said screw and said circumferential edge of said aperture is substantially maintained and, after said adjustment of said shank of said screw into said selected angular position, firmly joining said screw to said bottom of said pot by joining said connecting section to said edge of said aperture, wherein said selected angular position of said shank is maintained during and after said firmly joining of said screw to said bottom.

2. The method of claim 1, wherein said connecting section is joined to said edge of said aperture by resistance welding.

3. The method of claim 1, wherein said connecting section is of conical design shape.

4. The method of claim 1, wherein said bottom of said pot comprises a plurality of apertures each defining a respective central axis, wherein, according to the number of said plurality of apertures, a corresponding number of screws is provided each of which in said transitional area from said head to said shank comprises a respective connecting section tapering from said head to said shank and extending all round said circumference about a respective longitudinal axis of said respective screw, each of said screws being inserted through a respective aperture of said plurality of apertures from the inside of said pot, said respective connecting section being brought into bearing contact with said edge of said respective aperture, and each of said shanks of said screws being oriented in a respective selected angular position with respect to the respective central axis of said respective aperture, and each respective connecting section in the respective selected orientation being firmly joined to said respective edge of said respective aperture.

5. The method of claim 1, wherein said pot-shaped pressure vessel is an air spring pot for a vehicle.

6. The method of claim 1, wherein the angular position of said shank relative to said central axis can be selectively adjusted in all angular directions transverse to said central axis.

\* \* \* \* \*